(12) United States Patent
Grubeck et al.

(10) Patent No.: US 6,449,484 B1
(45) Date of Patent: Sep. 10, 2002

(54) METHOD AND ARRANGEMENT IN A RADIO COMMUNICATIONS SYSTEM

(75) Inventors: Hans G. Grubeck, Solna; Per J. Beming, Stockholm, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/007,057

(22) Filed: Jan. 14, 1998

(30) Foreign Application Priority Data

Jan. 28, 1997 (SE) .............................................. 9700246

(51) Int. Cl.$^7$ ................................................ H04Q 7/20
(52) U.S. Cl. ...................... 455/450; 455/452; 455/509; 455/516; 370/329; 370/348; 370/330
(58) Field of Search .................................. 455/450, 452, 455/453, 509, 516; 370/329, 330, 328, 331, 332

(56) References Cited

U.S. PATENT DOCUMENTS 5,722,073 A * 2/1998 Wallstedt et al. ........... 455/437
5,878,036 A * 3/1999 Spartz et al. ................ 370/335
6,031,832 A * 2/2000 Turina ........................ 370/348

* cited by examiner

Primary Examiner—Edward F. Urban
Assistant Examiner—Marceau Milord
(74) Attorney, Agent, or Firm—Burns, Doane, Swecker & Mathis, L.L.P.

(57) ABSTRACT

The present invention relates to a method and an arrangement for assignment of mobile stations (MS1–MS4) to so called multi-user channels (CH1, CH2) in a radio communication system. With information on mobile stations' (MS1, MS2 and MS3, MS4 respectively) power demands (P) from a base station (BS) with which they communicate, effective time spans for transmission of information (T) and/or relevant angular power spectrum ($a_1$, $a_2$) from the base station (BS) channels (CH1 and CH2 respectively) are allocated in such a manner that the total energy transmitted from each base station (BS) is minimized for transmitting information to its associated mobile stations (MS1–MS4). As a consequence the total level of interference in the radio communication system to which the base stations (BS) belong will be minimal, which results in a high efficiency for the system.

44 Claims, 6 Drawing Sheets

| TDMA-ram | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| CH1 | | | | | | | | | | | | | | | | | | | | | | | | | | | | | | | | |
| DL | | | | | | | | | DATA1(4) | | | | DATA2(4) | | | | DATA3(4) | | | | DATA4(4) | | | | | | | | | | | |
| USF | R(1) | | | | R(1) | | | | R(1) | | | | R(3) | | | | R(3) | | | | R(3) | | | | R(3) | | | | R(F) | | | |
| UL | | | | | 1DATA1(3) | | | | 1DATA2(3) | | | | 1DATA3(3) | | | | 3DATA1(4) | | | | 3DATA2(4) | | | | 3DATA3(4) | | | | 3DATA4(4) | | | |

METHOD AND ARRANGEMENT IN A RADIO COMMUNICATIONS SYSTEM

FIELD OF INVENTION

The present invention relates to a method of assigning mobile stations to radio channels in a mobile radio communications system. The radio channels are assumed to be so-called multi-user channels, in other words a plurality of mobile stations may share a channel over a given period of time.

The invention also relates to an arrangement and to a method for assigning multi-user channels to mobile stations in accordance with said method.

BACKGROUND OF THE INVENTION

In conventional radio communications systems for telephony, each unit is assigned its own channel with separate uplink and downlink. A given channel, represented for instance by a given time slot on a special carrier frequency, of a given base station cannot be assigned to a new mobile station before an earlier call connection on the channel has been released.

In the case of single-path non-selected transmission within the radio communications system, so-called broadcasting, a pool of available channels is utilized for transmitting messages with several simultaneous receivers. Many different algorithms for determining which of the available channels is most suitable for distributing this type of message have earlier been described. U.S. Patent Specification U.S. Pat. No. 5,530,917 teaches a method of optimizing channel utilization within a mobile telephony system. According to this method, channel assignment is effected on the basis of calculated load factors that have been obtained from at least two alternative sets of parameter values. The parameters include both radio-specific characteristics and other characteristics relevant to the call setup concerned. The method is applied both when changing channels for a call connection that has already been established and with handover.

International Patent Application WO-A1 96/07287 teaches a method of assigning carrier frequencies and time slots to mobile stations in a radio communications system of the TDMA/FDMA hybrid type (TDMA=Time Division Multiple Access. FDMA=Frequency Division Multiple Access). Mobile stations are assigned time slots on carrier frequencies such that mobile stations having roughly the same power output demand from the base station will be given the same carrier frequency. In consequence, the output power for each carrier frequency utilized is minimized and the available frequency band is used as effectively as possible. Interference in the radio communications system is also reduced.

International Patent Application WO-A1 95/07012 teaches a method in which base stations that encounter interference problems on certain of their channels are collected in a database. The base stations in the database are controlled to lower the output power on the channels concerned to a lowest value acceptable for the mobile stations that use these channels. An effort is thus made to constantly keep the number of base stations in the database as small as possible, therewith leading to a reduction in the interference in the radio communications system as a whole.

The service GPRS within GSM enables several mobile stations to use the same channel simultaneously for the transmission of information between a given base station and the mobile stations that are connected thereto (GPRS= General Packet Radio Service; GSM=Global System for Mobile communication). Each channel includes an uplink for the transmission of information from the mobile station to the base station, and a downlink for the transmission of information from the base station to the mobile station. The simultaneous use of a channel will mean that two or more mobile stations transmit and receive information on the channel in parallel, or that two or more mobile stations use the channel alternately over a given time period either to send information to a base station or to receive information from a base station. The downlink of a channel can be used typically to transmit information to a first mobile station at the same time as a second mobile station transmits on the uplink of the channel.

The information transmitted consists typically of data packets that are divided into information blocks of specific size. By reading a USF, different mobile stations of a limited number of stations can receive different information from one and the same information block, which is transmitted via a common physical channel (USF=Uplink State Flag). A USF, which is transmitted in the payload on the downlink of a channel and read by all mobile stations that use a specific channel, indicates to which mobile station the next-arriving information block is addressed and which mobile station may transmit information on the channel uplink in the next-arriving time slot.

GPRS pays no attention to individual communication parameters of the mobile stations when assigning a channel that is common to two or more mobile stations. The mobile station that has the highest output power requirement from the base station determines the output power level from the base station on the channel concerned. If the mobile station or the other mobile stations that share the channel places/ place considerably lower output power demands on the base station, the base station will transmit with an output power that falls markedly below the minimum output power required, at least for some of the time. When mobile stations that are located on very different directional bearings, as seen from the base station, are assigned the same channel, there are essentially three different ways of making the channel available to all of these mobile stations at one and the same time. (1) A separate antenna lobe may be aimed at each mobile station; (2) an angular power spectrum that is based on information concerning both the directional bearing to the mobile station and the propagation conditions for the radio waves between the base station and the mobile station may be generated for each mobile station, and; (3) there may be used an antenna lobe that is sufficiently wide to cover all mobile stations. In all of these cases, and particularly in the latter case, electromagnetic energy will be transmitted over a wider geographical area than is necessary in order to send information from the base station to the mobile stations.

In the method described in WO-A1 95/07012, the power on channels that have already been assigned is minimized. However, the method does not address how the assignment of mobile stations to the base stations should be carried out with the view of avoiding interference in a radio communications system.

The method taught by WO-A1 96/07287 results in mobile stations that have similar output power demands being assigned different channels on the same carrier frequency. However, the method provides no solution to the problem of how a channel should be assigned to several simultaneous users of the channel. Furthermore, no account is taken of how the mobile stations are orientated in relation to the base station or to the length of time over which the mobile stations ask for channel capacity. Neither is this taken into account when optimizing channel usage as disclosed in U.S. Pat. No. 5.530,917.

SUMMARY OF THE INVENTION

The present invention provides a solution to the problem of optimally assigning several simultaneous mobile stations to the channels of a base station. By optimal assignment is meant here an assignment in which the total energy transmitted in sending information from the base station to all mobile stations within its radio coverage area is minimized. One link in minimizing the energy transmitted may, for instance, be achieved by minimizing the output power on each channel from the base station.

Thus, one object of the present invention is to reduce the total interference in a radio communications system.

Another object of the invention is to optimize the extent to which the channels of a base station are utilized with respect to current communication requirements and to predicted future communications requirements.

According to one embodiment of the inventive method, there are registered base-station specific parameters which describe properties of mobile stations in the proximity of the base station. The parameters may denote the output power demanded by respective mobile stations of the base station, the effective transmission time span for transmission of the information to be transmitted, a positional bearing relative to the base station (that is to say, the sector of the angular power spectrum of the base station in which the mobile station is located), the direction in which the mobile moves and/or its speed. An algorithm in the form of, e.g., cost functions is then applied to the parameter values. A decision is then made on the basis of the result of the algorithm as to how the mobile stations in the proximity of the base station shall be assigned to the channels of the base station, such that the total energy transmitted in sending information from the base station to the mobile stations is minimized. Finally, the mobile stations are assigned channels in accordance with this decision. If the available parameter values do not provide sufficient basis for a precise determination of the energy required to transmit said information, this energy is, instead, predicted with the aid of available parameter values.

A method according to this embodiment of the invention has the characteristic features set forth in Claim 1.

In one advantageous variant of the embodiment of the invention described above, all channels of the base station are assigned to all mobile stations within the radio coverage area at specific time intervals, in other words also to connections that have already been established between mobile stations and the base station. Assignment of mobile stations to the channels of the base station can thus be changed during the ongoing transmission of information.

In another advantageous variant of the aforesaid embodiment of the invention, a prediction is made as to which mobile stations will be located within the area covered by the base station within a specific future. This prediction is based on information relating to the speed vectors of the mobile stations, i.e. their direction and speed. Setting-up of future predicted mobile stations may include mobile stations that at that particular moment are located in adjacent cells (on their way into the cell concerned) and need not necessarily include all of the mobile stations that are located within the coverage area of the base station at that particular time (it is judged that these mobiles will leave the cell concerned within a short period of time). The prediction can also take into account access requests from respective paging messages to totally new (i.e. not earlier observed) mobile stations located within the area covered by the base station. Such predictions are based on call history, where it is assumed that new call connections can be described as stochastic processes that are Poisson-distributed, for instance.

The invention also relates to a method of assigning multi-user channels to mobile stations. The method involves registering specific parameters that describe properties of mobile stations in the proximity of a given base station. The parameters may denote the output power demanded of respective mobile stations from the base station, the effective transmission time for the transmission of information to be transmitted, positional bearings in relation to the base station, the direction in which respective mobile stations are moving and/or their speed. In accordance with the inventive method, the mobile stations are allocated channels from the list of channels held by the base station on the basis of the values of these parameters, so as to minimize the total energy transmitted in sending information from the base station to the mobile stations.

A method according to this embodiment of the invention has the characteristic features set forth in Claim 20.

The invention also relates to an arrangement for assigning multi-user channels to mobile stations. The arrangement includes a control unit which registers specific parameters that describe properties of mobile stations in the proximity of a given base station. The parameters may denote the output power demands of respective mobile stations on respective channels from the base station, the effective transmission time span for the transmission of the information to be transmitted, positional bearings in relation to the base station, position, changes in registered power, changes in output power demands from the base station, direction of movement and/or speed. The arrangement allocates channels from the list of channels held by the base station to the mobile stations in accordance with the inventive method and on the basis of the values of these parameters.

An arrangement according to this embodiment of the invention has the characteristic features set forth in Claim 24.

According to one advantageous embodiment of the invention, the arrangement includes a control unit which generates state flags which for each channel and time frame indicate which mobile station is authorized to send information to the base station.

The invention is effective in minimizing the total energy transmitted from base stations when sending information to associated mobile stations. Since the energy transmitted is equivalent to the sum of the output power during the effective transmission time span, the average electromagnetic power transmitted will be minimized and the total interference in the radio communications system therewith also reduced. This enables each available channel in the system to be utilized in the most effective manner possible, which, in turn, imparts a high degree of efficiency to the radio communications system as a whole.

The invention will now be describe din more detail with reference to preferred embodiments thereof and with reference to the accompanying drawings.

DETAILED DESCRIPTION OF PREFERRED EMBODIMENTS

Figure 1:
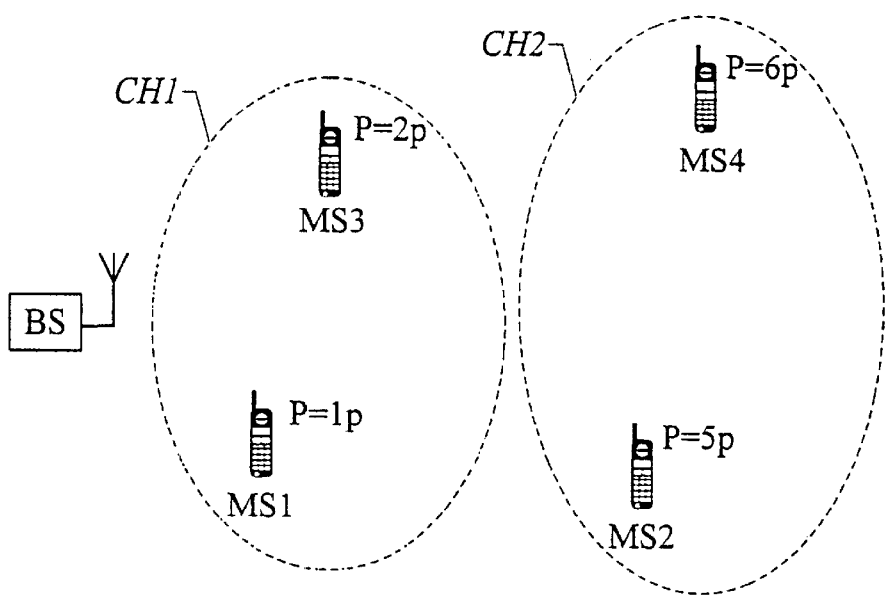
FIG. 1 shows how mobile stations in the vicinity of a base station are allocated channels from its list of channels in accordance with the value of a power parameter.

FIG. 1 shows mobile stations MS1–MS4 in the proximity of a base station BS. All of the mobile stations MS1–MS4 are assumed to be located within the area covered by the base station BS. A first mobile station MS1 indicates that its power requirement P from the base station BS is very low, let us say 1p (where p is a power unit, e.g. Watt, kilowatt or some corresponding unit). A second mobile station MS2 indicates with a power parameter value of 5p that it requires a relatively high output power from the base station BS. A third mobile station MS3 and a fourth mobile station MS4 have a respective output power requirement or demand P of 2p and 6p from the base station BS.

The base station BS must adapt the output power of each channel, i.e. the downlink, to that mobile station that at present receives information on the channel whose output power demand is highest. Consequently, if it is desired to minimize the total power transmitted from the base station BS, it is desirable to collect mobile stations that have a high output power demand on certain channels and mobile stations that have a lower output power demand on other channels. Seen generally, mobile stations that have similar output power demands should be allocated the same channel as far as possible. Such allocation can be achieved with the aid of a so-called cost function, which for each combination of mobile stations on the available channels delivers a cost value Ψ(P) that indicates the level of favourability of the combination concerned from an output power aspect. Providing that the number of mobile stations MS1–MS4 is an even number 2N, that two mobile stations $MSn_k$ and $MSm_k$ are assigned to each channel, and that the output power demand P of a given mobile station is channel-independent, then $$\Psi(P) = \sum_{k=1}^{2N} \tilde{P}_{n_k,m_k}$$

where $$\tilde{P}_{n_k,m_k} = \begin{cases} P_{n_k,m_k}, & \text{where } n_k \neq m_k \text{ and } n_k, m_k \neq n_1, m_1, \\ & \text{where } n_k, m_k = 1, \ldots, 2N \text{ and} \\ & l = 1, \ldots, k-1 \text{ and } N \in Z^+ \\ 0; & \text{otherwise} \end{cases}$$

where

IF $P_{n_k} \geq P_{m_k}$ THEN $P_{n_k,m_k} = P_{n_k}$
ELSE $P_{n_k,m_k} = P_{m_k}$ a cost function that gives the cost values Ψ(P) for combinations of mobile stations $MSn_k$ and $MSm_k$ that have a $P_{n_k}$ and $P_{m_k}$ respectively and where $P_{n_k,m_k}$ is the output power required to transmit information to the mobile stations $MSn_k$ and $MSm_k$.

When the first mobile station MS1 and the second mobile station MS2 are assigned to a first channel CH1, and the third mobile station MS3 and the fourth mobile station MS4 are assigned to a second channel CH2, the cost value Ψ(P)=5p+6p=11p is obtained.

On the other hand, if the first mobile station MS1 and the third mobile station MS3 are assigned to the first channel CH1 and the second mobile station MS2 and the fourth mobile station MS4 are assigned to the second channel CH2, the corresponding cost value Ψ(P)=2p+6p=8p.

The cost value for the remaining combination of the first mobile station MS1 and the fourth mobile station MS4 on the first channel CH1 and the second mobile station MS2 and the third mobile station MS3 on the second channel CH2 will be Ψ(P)=6p+5p=11p.

Thus, the first mobile station MS1 and the third mobile station MS3 should be assigned to the first channel CH1, and the second mobile station MS2 and the fourth mobile station MS4 should be assigned to the second channel CH2 (or vice versa) as illustrated in FIG. 1.

Figure 2:
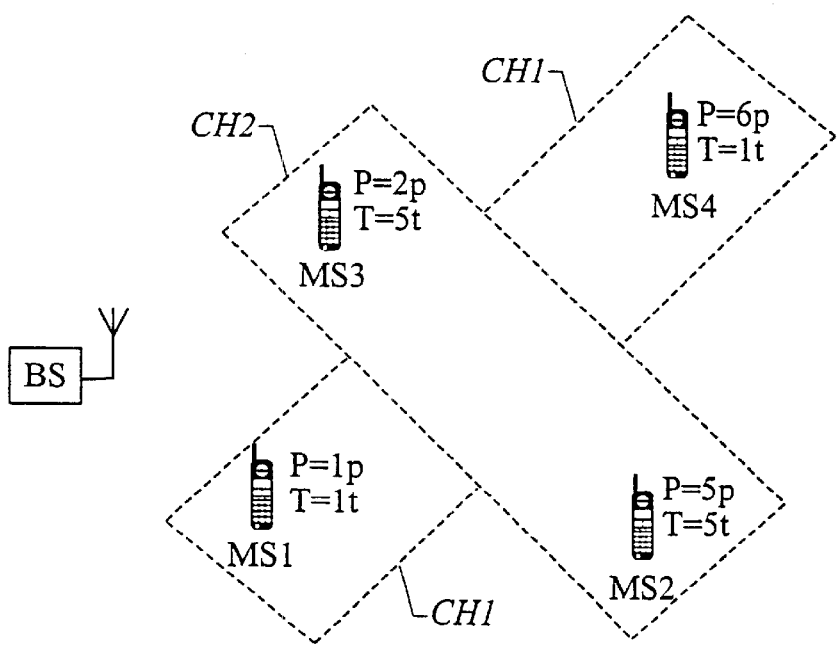
FIG. 2 shows how mobile stations in the vicinity of a base station are allocated channels from its list of channels in accordance with the value of a power parameter and a time parameter.

FIG. 2 shows mobile stations MS1–MS4 which are all positioned within the coverage area of a given base station BS. A first mobile station MS1 indicates an output power requirement P from the base station BS of P=1p. It also indicates that the effective time span T for transmission of information from the base station BS to the first mobile station MS1 is T=1t (where t is a time unit, such as seconds, milliseconds or some like time unit). Corresponding parameters for a second mobile station MS2 are P=5p and T=5t, for a third mobile station MS3 P=2p and T=5t, and for a fourth mobile station MS4 P=6p and T=1t.

Since the time span during which power is transmitted from the base station BS is decisive for the magnitude of the total energy transmitted, it is desirable to minimize the combined products between the output power demand P and effective transmission time T of respective mobile stations MS1–MS4.

Provided that the number of mobile stations MS1–MS4 is an even number 2N, that two mobile stations $MSn_k$ and $MSm_k$ are assigned to each channel, and that the output power demand P of a given mobile station is channel-independent, a cost function that takes into account the output power demand P of the mobile stations MS1–MS4 and also the effective transmission times T is:

$$\Psi(P, T) = \sum_{k=1}^{2N} \tilde{W}_{n_k, m_k}$$

where $$\tilde{W}_{n_k, m_k} = \begin{cases} W_{n_k, m_k}, & \text{where } n_k \neq m_k \text{ and } n_k, m_k \neq n_1, m_1, \\ & \text{where } n_k, m_k = 1, \ldots, 2N \text{ and} \\ & l = 1, \ldots, k-1 \text{ and } N \in Z^+ \\ 0; & \text{otherwise} \end{cases}$$

where
   IF $P_{n_k} \geq P_{m_k}$ THEN
     IF $T_{n_k} \geq T_{m_k}$ THEN $W_{n_k, m_k} = P_{n_k} \cdot T_{n_k}$
     ELSE $W_{n_k, m_k} = P_{n_k} \cdot T_{n_k} + P_{m_k} \cdot (T_{m_k} - T_{n_k})$
   ELSE
     IF $T_{m_k} \geq T_{n_k}$ THEN $W_{n_k, m_k} = P_{m_k} \cdot T_{m_k}$
     ELSE $W_{n_k, m_k} = P_{m_k} \cdot T_{m_k} + P_{n_k} \cdot (T_{n_k} - T_{m_k})$ which gives the cost values $\Psi(P,T)$ for combinations of mobile stations $MS_{nk}$ and $MS_{mk}$ with output power demands of $P_{n_k}$ and $P_{m_k}$ respectively, effective transmission times $T_{n_k}$ and $T_{m_k}$ and where $W_{n_k, m_k}$ is the energy required to send information to the mobile stations $MSn_k$ and $MSm_k$.

When the first mobile station MS1 and the second mobile station MS2 are assigned to a first channel CH1, and a third mobile station and the fourth mobile station MS4 are assigned to a second channel CH2, the cost value $\Psi(P,T) = 5.5pt + 6.1pt + 2.(5-1)pt = 39pt$.

When the first mobile station MS1 and the third mobile station MS3 are assigned to the first channel CH1 and the second mobile station and the fourth mobile station MS4 are assigned to the second channel CH2, the corresponding cost value is $\Psi(P,T) = 2.5pt + 6.1pt + 5.(5-1)pt = 36pt$.

When the first mobile station MS1 and the fourth mobile station MS4 are, instead, assigned to the first channel CH1 and the second mobile station MS2 and the third mobile station MS3 are assigned to the second channel CH2, the cost value is $\Psi(P,T) = 6.pt + 5.5pt = 31pt$.

Consequently, the first mobile station MS1 and the fourth mobile station MS4 will preferably be assigned to the first channel CH1 and the second mobile station MS2 and the third mobile station MS3 assigned to the second channel CH2, or vice versa. FIG. 2 illustrates this assignment of the mobile stations MS1–MS4.

In addition to assigning mobile stations MS1–MS4 that have similar output power demands P to the same channel as far as is possible, or to assign to the same channel mobile stations MS1–MS4 whose products between output power demands P and effective transmission times T are the same, it is also suitable to assign to the same channel those mobile stations MS1–MS4 whose directional bearing A is approximately the same with respect to the base station BS. When mobile stations that are located on essentially different directional bearings are assigned to the same channel, it is necessary for the base station BS either to use simultaneously several completely different angular power spectrums in transmission, or there must be used an antenna lobe which is sufficiently wide to cover all mobile stations. In both of these cases, electromagnetic energy will be transmitted over a wider geographical area than is necessary for transmitting information from the base station BS to the mobile stations MS1–MS4.

Figure 3:
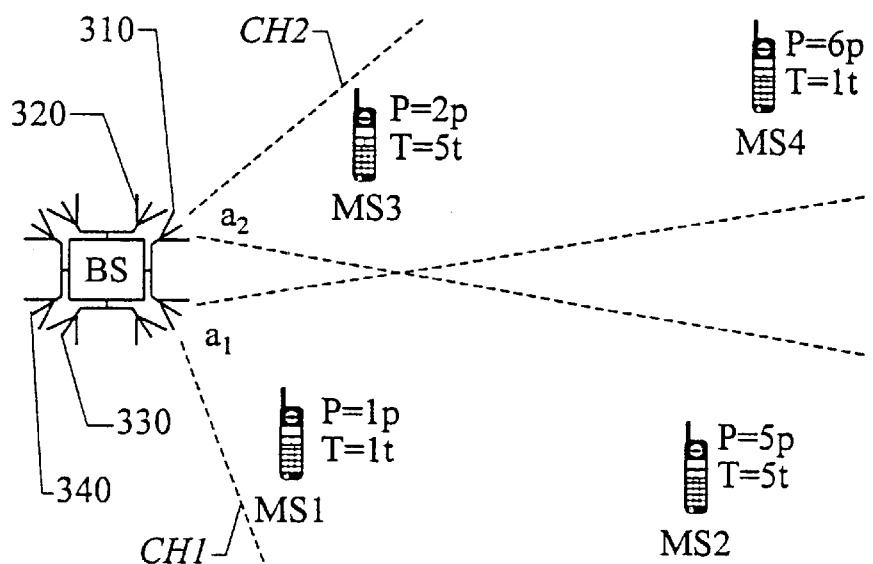
FIG. 3 shows how mobile stations in the vicinity of a base station are allocated channels from its list of channels in accordance with the value of a power parameter, a time parameter and an angular parameter.

FIG. 3 shows mobile stations MS1–MS4 located within the coverage range of a base station BS. In the illustrated case, the base station BS is equipped with at least one adaptive antenna 310–340, i.e. a directional sensitive antenna by means of which the base station BS is able to determine which configuration of the angular power spectrum A is relevant to mobile stations in the vicinity of the base station BS or at least in which directional bearing A relative to the base station BS a given mobile station is positioned.

A first mobile station MS1 positioned within a first sector $a_1$ of a first adaptive antenna 310 of the base station BS has an output power demand P from the base station BS of 1p, and an effective transmission time span T of 1t. Corresponding parameters $A = a_1$, $P = tp$ and $T = 5t$ for a second mobile station MS2, $A = a_2$, $P = 2p$ and $T = 5t$ for a third mobile station MS3, and $A = a_2$, $P = 6p$ and $T = 1t$ for a fourth mobile station MS4.

A cost function that takes into account the relevant configuration of the angular power spectrum A of the base station BS for the mobile stations MS1–MS4, the output power demand P of the mobile stations MS1–MS4, and effective transmission time spans T, provided that the number of mobile stations MS1–MS4 is an even number 2N, that two mobile stations $MSn_k$ and $MSm_k$ are assigned to each channel, and that the power output demand P of a given mobile station is channel-independent, is $$\Psi(P, T, A) = \sum_{k=1}^{2N} \tilde{W}_{n_k, m_k}$$

where $$\tilde{W}_{n_k, m_k} = \begin{cases} W_{n_k, m_k}, & \text{where } n_k \neq m_k \text{ and } n_k, m_k \neq n_1, m_1, \\ & \text{where } n_k, m_k = 1, \ldots, 2N \text{ and} \\ & l = 1, \ldots, k-1 \text{ and } N \in Z^+ \\ 0; & \text{otherwise} \end{cases}$$

where
   IF ($MSn_k$ and $MSm_k$ are positioned within the same sector $a_i$) THEN
     IF $P_{n_k} \geq P_{m_k}$ THEN
       IF $T_{n_k} \geq T_{m_k}$ THEN $W_{n_k, m_k} = P_{n_k} \cdot T_{n_k}$
       ELSE $W_{n_k, m_k} = P_{n_k} \cdot T_{n_k} + P_{m_k} \cdot (T_{m_k} - T_{n_k})$
     ELSE
       IF $T_{m_k} \geq T_{n_k}$ THEN $W_{n_k, m_k} = P_{m_k} \cdot T_{m_k}$
       ELSE $W_{n_k, m_k} = P_{m_k} \cdot T_{m_k} + P_{n_k} \cdot (T_{n_k} - T_{m_k})$
   ELSE $W_{n_k, m_k} = P_{n_k} \cdot T_{n_k} + P_{m_k} \cdot T_{m_k}$ which gives the cost values $\Psi(P,T,A)$ combinations of mobile stations $MSn_k$ and $MSm_k$ that either have the same configuration of angular power spectrum (typically located in the same sector $A = a_i$ of the angular power spectrum of the base station BS) or have different configurations of angular power spectrum (typically located in different sectors $A = a_i$ of the angular power spectrum of the base station ES) have respective output power demands of $P_{n_k}$ and $P_{m_k}$, respective effective transmission times of $T_{n_k}$ and $T_{m_k}$ and where $W_{n_k, m_k}$ is the energy required to send information to the mobile stations $MSn_k$ and $MSm_k$.

When the first mobile station MS1 and the second mobile station MS2 are assigned to a first channel CH1 and the third mobile station MS3 and the fourth mobile station MS4 are assigned to a second channel CH2, the cost value $\Psi(P,T,A)$ $5.5pt + 6.1pt + 2.(5-1)pt = 39pt$ is obtained.

On the other hand, when the first and third mobile stations MS1 and MS3 are assigned to the first channel CH1 and the second and the fourth mobile stations MS2 and MS4 are assigned to the second channel CH2, the corresponding cost value is $\Psi(P,T,A)=1.1pt+6.1pt+5.5pt+2.5pt=42pt$.

Finally, when the first and fourth mobile stations MS1 and MS4 are assigned to the first channel CH1 and the second and the third mobile stations MS2 and MS3 are assigned to the second channel CH2, the cost value is $\Psi(P,T,A)=1.1pt+6.1pt+5.5pt+2.5pt=42pt$.

Thus, the first and the second mobile stations MS1 and MS2 should preferably be assigned to the first channel CH1 and the third and fourth mobile stations MS3 and MS4 assigned to the second channel CH2, or vice versa. FIG. 3 illustrates this assignment of the mobile stations MS1–MS4.

When the effective transmission time spans for the information that will be transmitted from a given base station to mobile stations within its coverage area are not known, the present invention provides an optimization that minimizes the energy that the base station is expected to transmit, on the basis of other available parameters. This optimization can be made by assuming that the effective transmission times will be of long duration and equally as long for all mobile stations. Minimization of energy transmitted from the base station will then be the same as minimizing the power transmitted from the base station and therewith minimizing the energy transmission.

Figure 4:
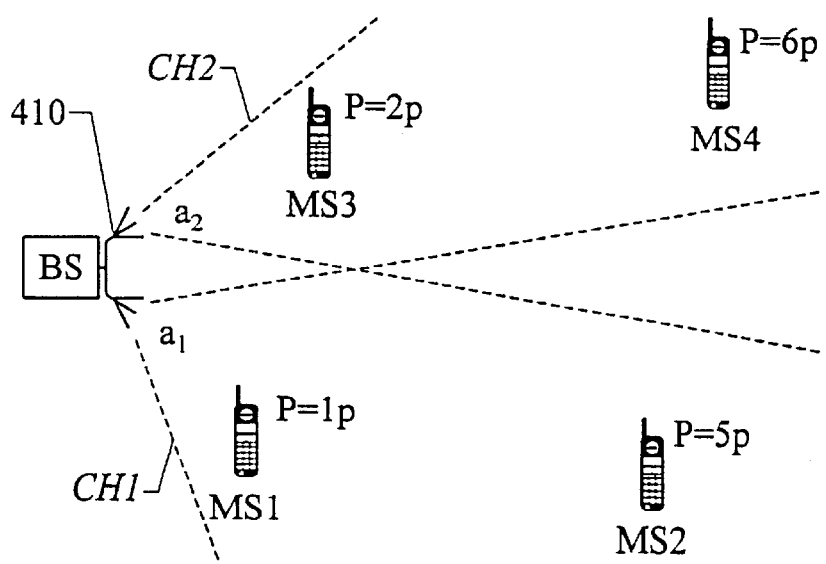
FIG. 4 shows how mobile stations in the vicinity of a base station are allocated channels from its list of channels in accordance with the value of a power parameter and an angular parameter.

FIG. 4 illustrates mobile stations MS1–MS4 in the vicinity of a base station BS. All of these stations MS1–MS4 are assumed to be positioned within the area covered by the base station BS.

A first mobile station MS1 has a first angular power spectrum configuration by virtue of being located within a first sector a, of an angular power spectrum of an adaptive antenna 410 of the base station BS, and has an output power demand P from the base station BS of 1p. A second mobile station MS2 is located within the same sector $a_1$ and has an output power demand P of 5p from the base station BS. A third and a fourth mobile station MS3 and MS4 respectively are located within a second sector $a_2$ of the adaptive antenna 410 and have an output power demand P from the base station of 2p and 6p respectively.

Provided that the number of mobile stations MS1–MS2 is an even number 2N, and that two mobile stations $MSn_k$ and $MSm_k$ are assigned to each channel, and that the output power demand P for a given mobile station is channel-independent, a cost function that takes into account the relevant configuration of the angular power spectrum A of the base station BS for the mobile stations MS1–MS4 and the output power demand B of the mobile stations MS1–MS4 will be $$\Psi(P,A) = \sum_{k=1}^{2N} \tilde{P}_{n_k,m_k}$$

where $$\tilde{P}_{n_k,m_k} = \begin{cases} P_{n_k,m_k}, & \text{where } n_k \neq m_k \text{ and } n_k, m_k \neq n_1, m_1, \\ & \text{where } n_k, m_k = 1, \ldots, 2N \text{ and} \\ & l = 1, \ldots, k-1 \text{ and } N \in Z^+ \\ 0; & \text{otherwise,} \end{cases}$$

where

IF ($MSn_k$ $MSm_k$ are positioned within the same sector $a_i$) THEN
 IF $P_{n_k} \geq P_{m_k}$ THEN $P_{n_k,m_k}=P_{n_k}$ ELSE $P_{n_k,m_k}=P_{m_k}$
 ELSE $P_{n_k,m_k}=P_{n_k}+P_{m_k}$ which gives the cost values $\Psi(P,A)$ for combinations of mobile stations $MSn_k$ and $MSM_k$ that either have the same angular power spectrum configuration $A=a_i$ (typically located in the same sector) or different angular power spectrum configurations $A=a_i$ (typically located in different sectors), have respective output power demands of $P_{n_k}$ and $P_{m_k}$ and where $P_{n_k,m_k}$ is the power transmitted when sending information to the mobile stations $MSn_k$ and $MSm_k$.

When the first and the second mobile stations MS1 and MS2 are assigned to a first channel CH1 and the third and the fourth mobile stations MS3 and MS4 are assigned to a second channel CH3, the cost value $\Psi(P,A)$ 5p+6p=11p is obtained.

When the first and the third mobile stations MS1 and MS3 are assigned to the first channel CH1 instead, and the second and the fourth mobile stations MS2 and MS4 are assigned to the second channel CH2, the corresponding cost value is $\Psi(P,A)=1p+2p+5p+6p=14p$.

The cost value will be $\Psi(P,A)=5p+6p+5p+2p=14p$ for the remaining combination of the first and the fourth mobile stations MS1 and MS4 assigned to the first channel CH1 and the second and third mobile stations MS2 and MS3 assigned to the second channel CH2.

The first and the second mobile stations MS1 and MS2 should thus be assigned to the first channel CH1, and the third and the fourth mobile stations MS3 and MS4 should be assigned to the second channel CH2, or vice versa.

Figure 5:
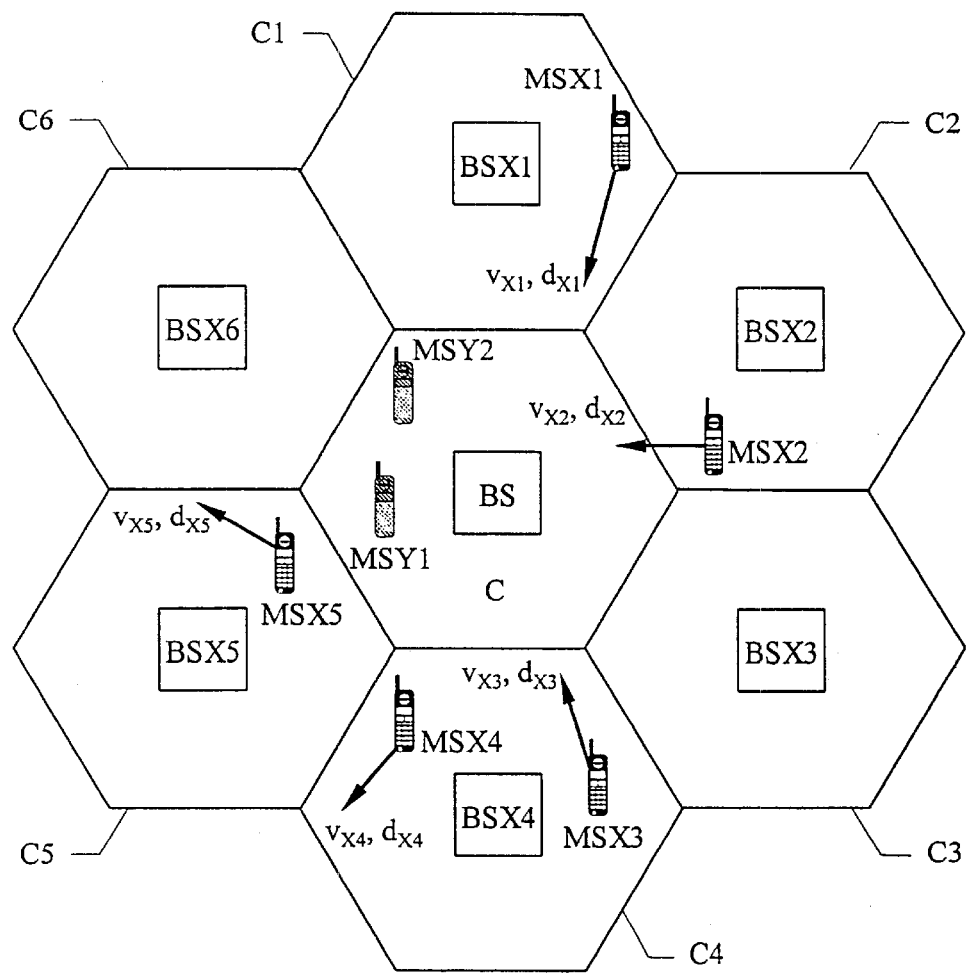
FIG. 5 illustrates movement of mobile stations in a cell structure within a radio communications system.

When wishing to optimize assignment of mobile stations to the available channels of a base station over a first time interval $\tau_1$, rather than instantaneously, from an energy aspect, it is also necessary to into account those mobile stations that are correctly located within the area covered by adjacent base stations but which are expected to communicate with the base station concerned within the first time interval $\tau_1$. FIG. 5 illustrates mobile stations MSX1–MSX5 that are located within the coverage areas of base stations BSX1–BSX6 that are represented by cells C1–C6 adjacent to a cell C that corresponds to the coverage area of a given base station BS. Two mobile stations MSY1 and MSY2 are also located within the coverage area C of the base station BS, these mobile stations representing mobile stations MSY1, MSY2 that are expected to commence communication within the base station BS within a second time interval $\tau_2$, with respect to the history of earlier call connections within the coverage area C. The assumption that such earlier unobserved mobile stations MSY1, MSY2 will either make an access request or receive a paging message within the second time period $\tau_2$ is based on call history, where it is assumed that new calls can be described as stochastic processes of Poisson distribution, for instance.

Thus, when calculating the aforesaid cost functions $\Psi$ for the base station BS, parameters P and/or T and/or A for those mobile stations MSX1–MSX3 and MSY1, MSY2 respectively are included, these mobile stations either having a speed $v_{x1}$, $v_{x2}$, $V_{x3}$ and a direction $d_{x1}$, $d_{x2}$, $d_{x3}$ which suggests that they can be expected to exchange information with the base station BS or, on probable grounds, can be expected to commence an exchange of information with the base station BS within a given time interval $\tau$. Data relating to speed vectors $v_{x1\text{-}5}$, $d_{x1\text{-}5}$ for possible future mobile stations MSX1–MSX5 can be obtained from Doppler shift measurements and/or extrapolation of time shift parameters (such as timing advance values, for instance) for those mobile stations MSX1–MSX5 that have been registered by base stations BSX1–BSX5 responsible for those adjacent cells in which the mobile stations MSX1–MSX5 are located at that moment.

All cost functions $\Psi(P)$, $\Psi(P,T)$, $\Psi(P,T,A)$ and $\Psi(P,A)$ described with reference to FIGS. 1, 2, 3 and 4 respectively presume that the transfer of information from the base station BS to the mobile stations MS1–MS4 has commenced immediately, i.e. without delay.

When a certain channel assignment delay $\Delta T_{MAX}$ can be accepted, it is possible to further reduce the total energy transmitted from the base station. Naturally, the highest tolerated delay $\Delta T_{MAX}$ may not exceed a value stipulated by the transmission priority of potential mobile stations.

Figure 6A:
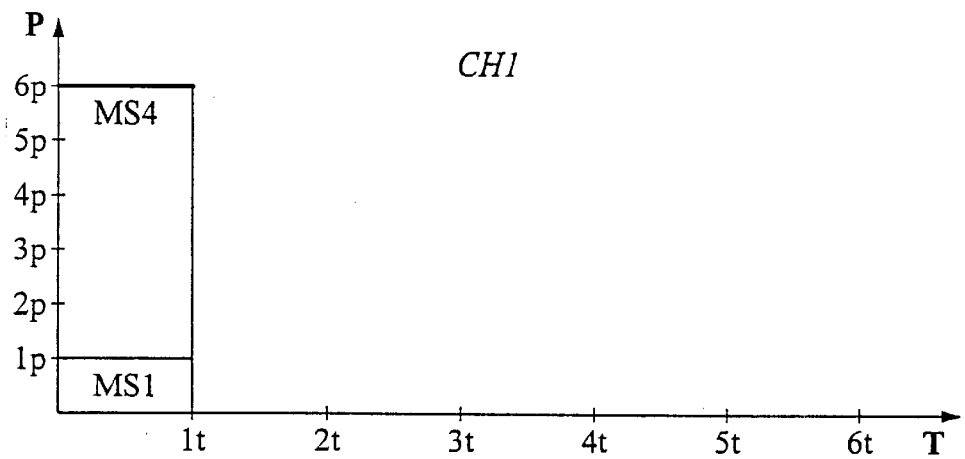
FIGS. 6a, b are diagrammatic illustrations of how mobile stations are allocated a first and a second channel respectively.
Figure 6B:
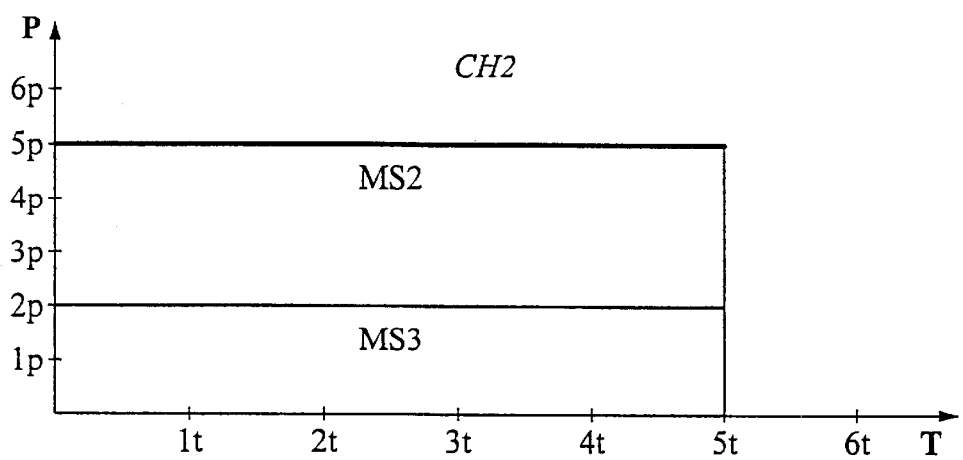

For instance, the total energy transmitted from the base station BS in the example described with reference to FIG. 2 above could be reduced from $\Psi(P,T)=31\text{pt}$ to $\Psi(P,T)=28\text{pt}$ if a maximum delay $\Delta T_{MAX}=5T$ could be accepted. FIG. 6a is a diagrammatic illustration of how the first and fourth mobile stations MS1 and MS4 are assigned to a first channel CH1, wherewith a transmitted energy of 6pt is obtained (i.e. the area beneath maximum output power requirement). FIG. 6b is a corresponding diagrammatic illustration of how the second and the third mobile stations MS2 and MS3 are assigned to a second channel CH2, therewith obtaining a transmitted energy of 25pt. All transmissions are commenced immediately at time T=0t and take place in parallel. The total energy transmitted is $\Psi(P,T)=6\text{pt}+25\text{pt}=31\text{pt}$.

Figure 7:
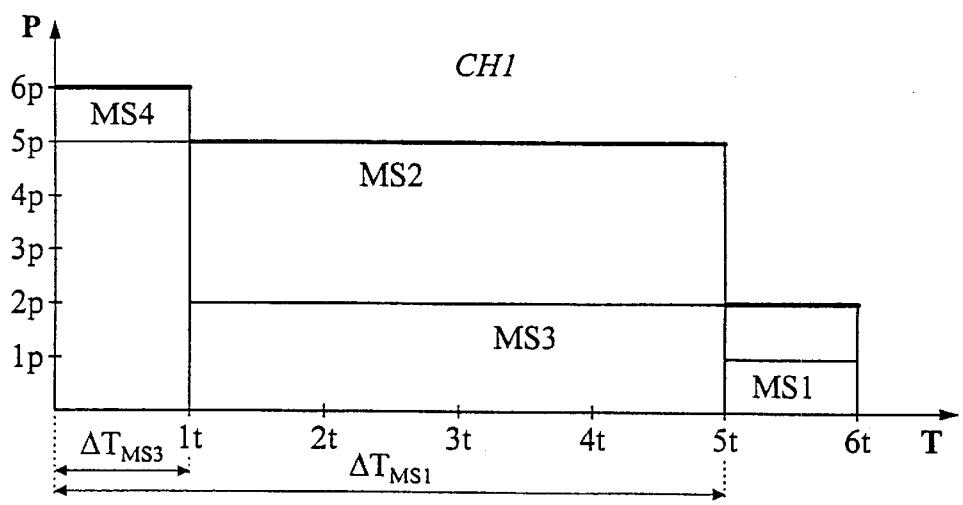
FIG. 7 is a diagrammatic illustration of how the mobile stations in FIGS. 6a and 6b are allocated one and the same channel.

When all mobile stations MS1–MS4 are assigned to one and the same channel CH1, the total energy transmitted from the base station BS can be further reduced. We still assume that a maximum of two mobile stations $MSn_k$ and $MSm_k$ can utilize the channel CH1 at each given moment in time, typically uplink and downlink respectively. It is therefore necessary for two of the mobile stations MS3 and MS1 to wait until information transmissions from the base station BS to the two remaining mobile stations MS1 and MS4 have been completed before commencing the transmission of information to the mobile stations MS1, MS3. The lowest total energy transmission from the base station BS is obtained when the channel CH1 is allocated initially to the second mobile station MS2 and to the fourth mobile station MS4. The channel CH1 is allotted to the third mobile station MS3 at time T=1t, and to the first mobile station MS1 at the time T=5t. The third mobile station MS3 is thus delayed by $\Delta T_{MS3}=1\text{t}$ and a corresponding delay in respect of the first mobile station MS1 is $\Delta T_{MS1}=5\text{t}$. This circumstance is illustrated in FIG. 7, from which it will also be apparent that the total energy transmitted from the base station BS will be $\Psi(P,T)=6.1\text{pt}+5.(5-1)\text{pt } 2.(6-5)\text{pt}=28\text{pt}$.

A further reduction in the energy transmitted from the base station can also be achieved when allowing the information transmissions from the base station to the mobile stations to be divided into smaller information units, for instance units in the size of data blocks. However, such division is liable to result in the summated time for transmitting the divided information units will exceed the transmission time for the original arrangement of information.

Figure 8:
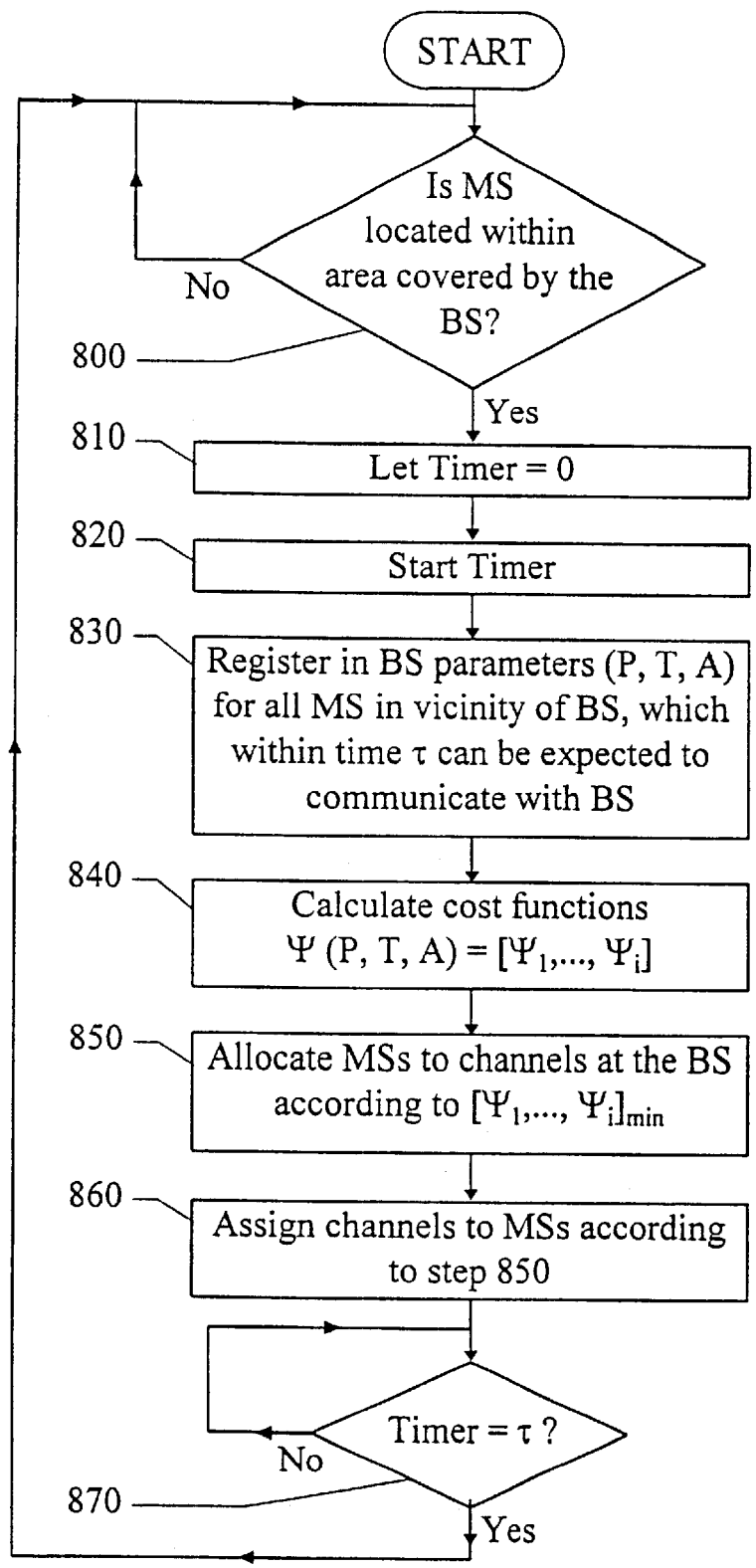
FIG. 8 is a flowchart illustrating one embodiment of the inventive method.

FIG. 8 is a flowchart illustrating one embodiment of the inventive method in which the total energy transmitted in sending information from a given base station BS to mobile stations MS in the vicinity of said base station is minimized. In a first step 800, a check is made to ascertain whether or not mobile stations MS are located within the area covered by the base station BS. If mobile stations are found to be present, a timer is set to zero in the next step 810, otherwise step 800 is repeated until a mobile station MS is located within the coverage area of said base station BS. The timer is started in step 820, wherewith its time parameter begins to run and parameters P and/or T and/or A in respect of all mobile stations MS in the vicinity of the base station BS and which can be expected to communicate with the base station within a determined time τ are registered by the base station BS in step 830. Parameters P, T and A for certain mobile stations MS in cells adjacent to the cell concerned are also registered. Cost values $\Psi_1, \Psi_2, \ldots, \Psi_i$ for all i possible combinations of the mobile stations MS on the channels of the base station BS are calculated in step 840 in accordance with a cost function $\Psi(P,T,A)$. In the next step 850, the mobile stations MS are assigned to the channels in accordance with the combination that gave the lowest cost value $\Psi_{min}$ in the preceding step 840. In step 860, the mobile stations MS are assigned to said channels by, e.g., USFs being sent from the base station BS. The procedure waits in the final step 870 until the time parameter of the timer has reached a determined value τ, whereafter the procedure returns to step 800.

Figures 9, 10:
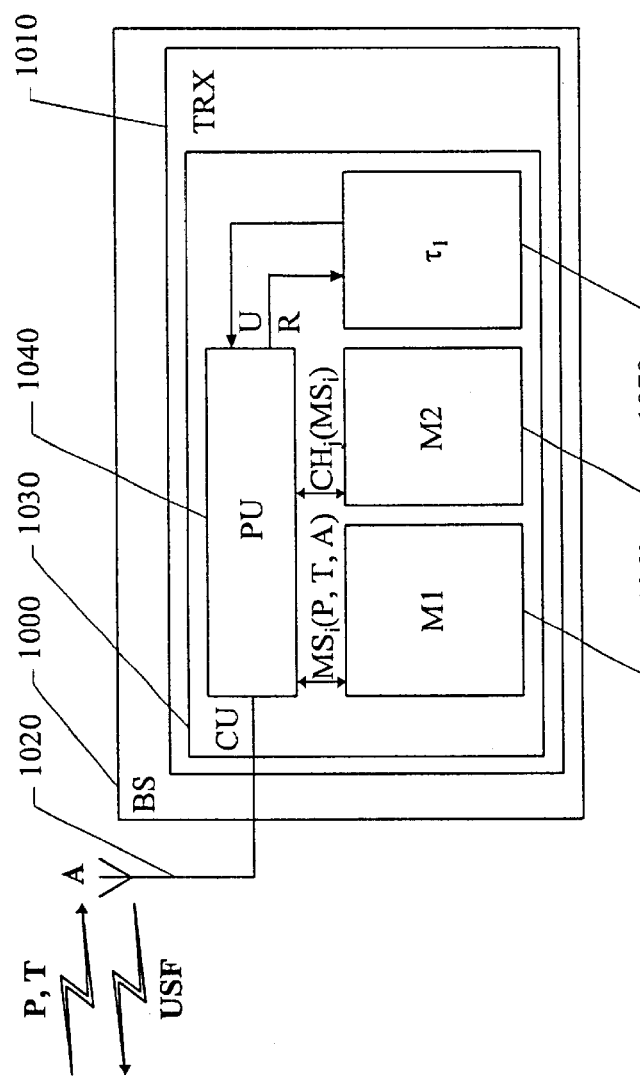
FIG. 9 is a graphic illustration of how three mobile stations share a logic channel during a given time span.
FIG. 10 illustrates an embodiment of the inventive arrangement.

In GSM, a TDMA frame is comprised of eight time slots numbered from zero to seven. These time slots form eight so-called physical channels. A number of TDMA frames together form a multiframe. Multiframes are used in GSM as carriers of so-called logic channels, which may be used to transmit packet data, for instance. A certain such logic channel is comprised of a determined time slot in each TDMA frame on a separate carrier frequency. When data is transferred physically between a base station and a mobile station, each information block is divided into four data bursts of mutually equal size, each comprising 60 information bits, for instance. When the radio communications system is a TDMA system, the data bursts can be transmitted bit-interleaved in four consecutive time slots on a time-divided channel. FIG. 9 illustrates the division of a logic channel CH1 of a base station divided into TDMA frames. In the illustrated example, the channel CH1 will be shared by three mobile stations MS1, MS2 and MS3 during a time span corresponding to the TDMA frames 1–32.

A first mobile station MS1 and a third mobile station MS3 transmit information to the base station, while a second mobile station MS2 receives information from said base station.

This information is assumed to be data that has been divided into information blocks. Each information block is assumed to occupy four consecutive TDMA frames and is designated DATA# ($\#_{tot}$), where #($\#_{tot}$) denotes the ordinal number of the information block concerned and the total number of blocks in the transmission. A numerical prefix of an information block in uplink discloses the mobile station from which the block originates. Thus, 3DATA2 (4) designates the second information block in a transmission of a total of four blocks from the mobile station MS3 to the base station. USF indicates the mobile station MS for which the uplink of the channel CH1 has been reserved in the next following four TDMA frames and specifies R(#ms). Thus, R(1) means that the uplink of channel CH1 is used by the first mobile station MS1 during the following four TDMA frames. When transmitting in the downlink, i.e. when transmitting information from the base station to a mobile station, address information lies in the actual information block and consequently no flag corresponding to USF is required.

Naturally, information can be divided in other ways. Similarly, corresponding frame division can be effected in a CDMA system or an FDMA system.

The aforementioned effective transmission time T for transmitting information from a base station to a specific mobile station is thus proportional to the number of information blocks $\#_{tot}$ included in the current transmission. In the described TDMA example, the effective transmission time T is determined as T=4 (the time of a data burst) $\#_{tot}$.

In the initial TDMA frames 1–4, the base station sends a USF that states R(1) that a first mobile station MS1 is authorized to send a first information block 1DATA1(3) in the next-following four TDMA frames 5–8 on the uplink of the channel CH1. The next USF, which is sent during the TDMA frames 5–8, states that R(1) the first mobile station MS1 may send a second information block 1DATA2(3) during the next-following four TDMA frames 9–12. The first mobile station MS1 sends the first information block 1DATA1(3) at the same time. During the TDMA frames 9–12, there is sent a USF that indicates that R(1) the first mobile station MS1 may continue to send information 1DATA3(3). Information DATA1(4) is sent to the second mobile station MS2 on the downlink of the channel CH1 at the same time, and the first mobile station MS1 sends the second information block 1DATA2(3) on the downlink of the channel CH1. The USF sent during the TDMA frames 13–16 contains information to the effect that R(3) the third mobile station MS3 may begin to send information on the uplink of the channel CH1 in TDMA frame 17. The downlink information DATA2(4) during the TDMA frames 13–16 is also intended for the second mobile station MS2 and the first mobile station MS1 sends the third and the last information block 1DATA3(3) on the uplink. The content DATA3(4) of the TDMA frame 17–20 on the downlink is also intended for the second mobile station MS2. During these TDMA frames 17–20, the base station sends a USF that shows that R(3) the uplink is at the disposal of the third mobile station MS3 during the TDMA frames 21–24 for transmission of a second information block 3DATA2(4). The third mobile station MS3 sends a first information block 3DATA1(4) parallel therewith. The downlink information DATA4(4) during the TDMA frames 21–24 is also addressed to the second mobile station MS2 and the USF transmitted during the TDMA frames 21–24 states that r(3) the third mobile station MS3 can send a further data block 3DATA3(4) during the TDMA frames 25–28. The third mobile station MS3 sends a second information block 3DATA2(4) at the same time. The downlink has no information content during the time of the TDMA frames 25–28 (i.e. the downlink contains only dummy bits sent form the base station on the channel CH1) and the third mobile station MS3 sends a third information block 3DATA3(4). USF indicates in the TDMA frames 25–28 that R(3) the third mobile station MS3 may send a last information block 3DATA4(4) during the TDMA frames 29–32, while the downlink of the channel CH1 is still empty. The terminating information block 3DATA4(4) is sent by the third mobile station MS3 during these TDMA frames 25–28.

FIG. 10 illustrates an embodiment of the inventive arrangement. A control unit 1030 receives from a base station 1000 information relating to output power demand P, effective transmission times T and the relevant configuration of the angular power spectrum A for mobile stations in its vicinity. In the illustrated case, the control unit 1030 is included in a transceiver unit 1010 in the base station 1000, since the received parameters P, T and A are found available in the transceiver unit 1010. However, it is quite feasible to place the control unit in any other desired position within or outside the base station 1000. Information concerning the relevant configuration of the angular power spectrum A of the mobile stations may conveniently be obtained with the aid of an adaptive antenna 1020. However, the information A can be generated in accordance with alternative methods with the aid of, e.g., GPS receivers in the mobile stations (GPS=Global Positioning System).

The parameter values $MS_i(P,T,A)$ for the mobile stations MS1–MSn, where i=1, ..., n in the vicinity of the base station 1000 are transferred from a processor unit 1040 in the control unit 1030 and stored in a first storage unit 1050. When the parameter values ($MS_i(P,T,A)$) for all mobile stations MS1–MSn have been registered in the first storage unit 1050, the processor unit 1040 distributes the mobile stations MS1–MSn over the available channels CH1–CHm in the base station 1000 in accordance with the proposed method, assigns each mobile station to a channel $CH_j(MS_i)$, where j=1, ..., m; i=1, ... n and stores the result in a second storage unit 1060 which may, of course, also consist of a second partition of the first storage unit 1050. The processor unit 1040 then generates USFs for the channels CH1–CHm in accordance with the channel allocation. When a predetermined time τ has passed since the last registration of the parameter values $MS_i(P,T,A)$ for the mobile stations MS1–MSn, a timer unit 1070 delivers a first signal U which causes the processor unit 1040 to perform a new collection of parameter values P, T and/or A and a new assignment of mobile stations MS1–MSn to the base station channels CH1–CHm. After having received the first signal U, the processor unit 840 sets the timer unit 1070 to zero via a second signal R, wherewith the time parameter of the time unit 870 begins again to run.

What is claimed is:

1. A method of transmitting packet data on a multi-user channel in a mobile radio communications system comprising the steps of:

predicting the future presence of mobile stations within the coverage area of a base station, this prediction being based on information relating to the speed and direction of movement of mobile stations that are in communication with base stations whose respective coverage areas are adjacent to the coverage area of said base station, wherein said prediction also includes new mobile stations that are expected to commence communication with said base station within a second time interval;

determining assignments for said multi-user channel based on a plurality of parameters that minimize total transmission energy for transmitting packet data from said base station to a plurality of mobile stations; and assigning at least two mobile stations to said multi-user channel based on said assignments.

2. A method according to claim 1, wherein said plurality of parameters include a first time interval for mobile stations which will commence communication with the base station within said first time interval.

3. A method according to claim 1, further comprising the step of:

predicting the future presence of mobile stations within the coverage area of said base station based on information relating to the position and the change in measured power from mobile stations that are in communication with base stations whose respective coverage areas are adjacent to the coverage area of said base station.

4. A method according to claim 1, further comprising the step of:

predicting the future presence of mobile stations within the coverage area of said base station based on information relating to the position and the change of output power demands from current base stations of mobile stations that are in communication with base stations whose respective coverage areas are adjacent to the coverage area of said base station.

5. A method according to claim 1, characterized by compiling a list of mobile stations located within the coverage area of said base station, and said predicted future mobile stations within the coverage area of said base station; and in that said parameters include the parameter values for all mobile stations included in said list.

6. A method according to claim 1, wherein said parameters include measured or estimated output power demands from said base station for each of said mobile stations and in that the power transmitted from the base station is minimized for each of said channels.

7. A method according to claim 6, wherein said parameters include information relating to actual or estimated effective transmission time for that information which each of said mobile stations wishes to transmit; and in that said mobile stations are assigned to said channels such that the sum of the products between output power demands and effective transmission time spans for respective mobile stations is minimized.

8. A method according to claim 1, wherein said parameters include information relating to the relevant configuration of the angular power spectrum for the radio power from said base station for each of said mobile stations; and in that mobile stations that have similar configurations of the angular power spectrum of said base station are preferably assigned to one of the same channel.

9. A method according to claim 8, wherein mobile stations whose positions in relation to said base station are such as to fall within the same sector of the angular power spectrum of the base station are preferably assigned to one of the same channel.

10. A method according to claim 8, wherein the configuration of the angular power spectrum of the base station is determined with the aid of at least one adaptive antenna.

11. A method according to claim 8, further comprising the step of:
assigning the mobile stations to said channels such as to minimize the sum of the maximum output power demands for utilized configuration of the angular power spectrum of said base stations.

12. A method according to claim 8, further comprising the step of:
assigning the mobile stations to said channels such as to minimize the sum of the maximum products between output power demands for the effective transmission time spans of utilized configuration of the angular power spectrum of said base stations.

13. A method according to claim 1, further comprising the step of:
assigning one or more mobile stations in a first group of said mobile stations in time wise after one or more mobile stations in a second group of said mobile stations.

14. A method according to claim 13, further comprising the step of:
commencing assignment of mobile stations from said first group immediately upon termination of the transmission of information from the base station to at least one mobile station in said second group.

15. A method according to claim 13, characterized by commencing assignment of mobile stations from said first group before the transmission of information between the base station and mobile stations from said second group has been terminated.

16. A method according to claim 1, characterized by assigning pairs of mobile stations.

17. A method according to claim 1, characterized by specifying said output power demand separately for each channel in the list of channels held by the base station.

18. A method of assigning a plurality of mobile stations to multi-user channels for transmission of packet data in a mobile radio communications system, wherein the mobile stations are assigned to channels to enable communication of packet data between a base station and the mobile stations, the method comprising the steps of:
selecting which mobile stations to assign to which channels based on an optimization result;
deriving said optimization result by:
choosing, taking into account a set of parameters associated with the respective mobile stations, a combination of at least two mobile stations to simultaneously share a first channel such that the at least two mobile stations are to use the first channel in parallel to communicate with the base station, which combination is chosen to be the combination that allows for minimization of the total energy transmitted from the base station in the transmission of packet data from said base station to said mobile station.

19. A method according to claim 18, wherein each of said channels includes an uplink for transmitting information from a mobile station to a base station and a downlink for transmitting information form the base station to a mobile station, and further comprising the step of:
generating state flags which, for each channel within a list of channels held by the base station, indicate with each time frame, the mobile station which is authorized to send information to the base station.

20. A method according to claim 19, further comprising:
storing the parameter values of said set of parameters associated with the respective mobile stations; and
storing the assignment of mobile stations to respective channels.

21. A method according to claim 20, further comprising:
specifying time points at which said assignment of mobile stations shall take place.

22. A method according to claim 18, wherein said set of parameters include a first time interval, parameter values for a first set of mobile stations which will commence communication with the base station within said first time interval, and parameter values for a second set of mobile stations which are already in communication with the base station; and wherein the plurality of mobile stations assigned to the channels include the first and second set of mobile stations.

23. A method according to claim 18, further comprising the step of predicting the future presence of mobile stations within the coverage area of the base station based on information relating to the speed and direction of movement of mobile stations that are in communication with base stations whose respective coverage areas are adjacent to the coverage area of said base station.

24. A method according to claim 18, further comprising the step of:
predicting the future presence of mobile stations within the coverage area of said base station based on information relating to the position and the change in measured power from mobile stations that are in communication with base stations whose respective coverage areas are adjacent the coverage area of said base station.

25. A method according to claim 24, wherein said predicting is also based on new mobile stations that are expected to commence communication with said base station within a second time interval.

26. A method according to claim 25, further comprising the step of:

compiling a list of mobile stations located within the coverage area of said base station, and the predicted future mobile stations within the coverage area of the base station; and in that said set of parameters includes the parameter values for all mobile stations included in said list.

27. A method according to claim 18, further comprising the step of:

predicting the future presence of mobile stations within the coverage area of said base station based on information relating to the position and the change of output power demands from current base stations of mobile stations that are in communication with base stations whose respective coverage areas are adjacent to the coverage area of said base station.

28. A method according to claim 27, wherein said predicting step is also based on new mobile stations that are expected to commence communication with said base station within a second time interval.

29. A method according to claim 18, wherein said set of parameters includes measured or estimated output power demands from said base station for each of said mobile stations and wherein the power transmitted from the base station is minimized for each of said channels.

30. A method according to claim 29, wherein said set of parameters includes information relating to actual or estimated effective transmission time for that information which each of said mobile stations wishes to transmit; and wherein said mobile stations are assigned to said channels such that the sum of the products between output power demands and effective transmission time spans for respective mobile stations is minimized.

31. A method according to claim 18, wherein said set of parameters includes information relating to the relevant configuration of the angular power spectrum for the radio power from said base station for each of said mobile stations; and wherein mobile stations that have similar configurations of the angular power spectrum of said base station are preferably assigned to share one and the same channel.

32. A method according to claim 31, wherein mobile stations whose positions in relation to said base station are such as to fall within the same sector of the angular power spectrum of the base station are preferably assigned to share one and the same channel.

33. A method according to claim 31, wherein the configuration of the angular power spectrum of the base station is determined with the aid of at least one adaptive antenna.

34. A method according to claim 31, further comprising the step of assigning the mobile stations to said channels such as to minimize the sum of the maximum output power demands for utilized configurations of the angular power spectrum of said base station.

35. A method according to claim 31, further comprising the step of assigning the mobile stations to said channels such as to minimize the sum of the maximum products between output power demands and the effective transmission time spans of utilized configurations of the angular power spectrum of said base station.

36. A method according to claim 18, further comprising the step of assigning one or more mobile stations in a first group of said mobile stations time-wise after one or more mobile stations in a second group of said mobile stations.

37. A method according to claim 36, further comprising the step of commencing assignment of mobile stations from said first group immediately upon termination of the transmission of information from the base station to at least one mobile station in said second group.

38. A method according to claim 36, further comprising the step of commencing assignment of mobile stations from said first group before the transmission of information between the base station and mobile stations from said second group has been terminated.

39. A method according to claim 18, wherein pairs of mobile stations are assigned to each of said channels.

40. A method according to claim 18, further comprising the step of specifying an output power demand separately for each channel in a list of channels held by the base station.

41. A base station arranged for assigning a plurality of mobile stations to multi-user channels for transmission of packet data in a mobile radio communications system wherein the mobile station are assigned to channels to enable communication of packet data between the base station and the mobile stations, which base station includes a control unit which is configured to:

select which mobile stations to assign to which channels based on an optimization result; and derive said optimization result by:

choosing, taking into account a set of parameters associated with the respective mobile stations, a combination of at least two mobile stations to simultaneously share a first channel such that the at least two mobile stations are to use the first channel in parallel to communicate with the base station, wherein the combination chosen is the combination that allows for minimization of the total energy transmitted from the base station in the transmission of packet data from said base station to said mobile stations.

42. A base station according to claim 41, wherein each of said channels includes an uplink for transmitting information from a mobile station to the base station, and a downlink for transmitting information from the base station to a mobile station, and wherein the control unit is further configured to:

generate state flags which, for each channel within the channel set-up of the base station, indicate per time frame the mobile station that is authorized to send information to the base station.

43. A base station according to claim 42, wherein said control unit comprises:

a processor unit for processing the parameter values of said parameters; and at least one storage unit for registering parameter values for said set of parameters associated with the respective mobile stations and storing mobile stations assigned to respective channels.

44. A base station according to claim 43, wherein said control unit further comprises:

a timer unit for indicating time points at which said assignment of mobile stations shall take place, wherein said time unit is set to zero by a first signal from said processor unit, and wherein after a given time, said time unit delivers a second signal which causes said control unit to update said assignment.

* * * * *